(12) United States Patent
Onishi et al.

(10) Patent No.: US 10,882,560 B2
(45) Date of Patent: Jan. 5, 2021

(54) VEHICLE-BODY LOWER STRUCTURE

(71) Applicant: Toyota Jidosha Kabushiki Kaisha, Toyota (JP)

(72) Inventors: Yukihiro Onishi, Kariya (JP); Nobuhiro Ichimura, Kariya (JP); Mikio Nakashima, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/293,780

(22) Filed: Mar. 6, 2019

(65) Prior Publication Data

US 2019/0276086 A1 Sep. 12, 2019

(30) Foreign Application Priority Data

Mar. 8, 2018 (JP) .................................. 2018-041767

(51) Int. Cl.
*B62D 25/02* (2006.01)
*B62D 27/02* (2006.01)
*B62D 21/15* (2006.01)

(52) U.S. Cl.
CPC ......... *B62D 25/025* (2013.01); *B62D 21/157* (2013.01); *B62D 27/023* (2013.01)

(58) Field of Classification Search
CPC .. B62D 25/025; B62D 21/157; B62D 27/023; B62D 25/04; B62D 25/20; B62D 21/02
USPC .............................. 296/204, 187.12, 209, 30
See application file for complete search history.

(56) References Cited

U.S. PATENT DOCUMENTS

| 2004/0012230 A1* | 1/2004 | Burge | B62D 25/025 296/209 |
|---|---|---|---|
| 2006/0097533 A1* | 5/2006 | Watanabe | B62D 25/025 296/30 |
| 2011/0175399 A1* | 7/2011 | Nakano | B62D 25/025 296/193.05 |
| 2013/0049408 A1* | 2/2013 | Kurogi | B62D 25/025 296/209 |
| 2016/0311471 A1* | 10/2016 | Iyoshi | B62D 25/025 |
| 2016/0325785 A1* | 11/2016 | Nakagawa | B62D 25/025 |

(Continued)

FOREIGN PATENT DOCUMENTS

| JP | 2014-104832 A | 6/2014 |
| JP | 2015113059 A | 6/2015 |
| JP | 2016094064 A | 5/2016 |

*Primary Examiner* — Jason S Morrow
*Assistant Examiner* — E Turner Hicks
(74) *Attorney, Agent, or Firm* — Dinsmore & Shohl LLP (57) ABSTRACT

A vehicle-body lower structure includes: a side sill; and a cross member, wherein the side sill includes a side sill outer and a side sill inner, a bulk having a shape corresponding to the cross member is provided on the opposite side of the side sill inner from the cross member in a closed-section space formed by the side sill outer and the side sill inner, and the bulk includes a front wall portion, a rear wall portion placed behind the front wall portion in the vehicle-body front-rear direction, and a connecting wall portion connecting the front wall portion and the rear wall portion, the front wall portion and the connecting wall portion forming a first edge line extending in the vehicle width direction, and the rear wall portion and the connecting wall, portion forming a second edge line extending in the vehicle width direction.

20 Claims, 6 Drawing Sheets

(56) References Cited

U.S. PATENT DOCUMENTS

2017/0113730 A1* 4/2017 Sakurada ............. B62D 21/157
2017/0305469 A1* 10/2017 Iyoshi ................. B62D 27/023

* cited by examiner

VEHICLE-BODY LOWER STRUCTURE

CROSS-REFERENCE TO RELATED APPLICATIONS

This application claims priority to Japanese Patent Application No. 2018-041767 filed on Mar. 8, 2018, which is incorporated herein by reference in its entirety including the specification, drawings and abstract.

BACKGROUND

1. Technical Field

The disclosure relates to a vehicle-body lower structure.

2. Description of Related Art

As a vehicle-body lower structure in the related art, there has been known a technique described in Japanese Unexamined Patent Application Publication No. 2015-113059 (JP 2015-113059 A), for example, The vehicle-body lower structure described in JP 2015-113059 A includes side sills extending in the vehicle front-rear direction, and a floor cross member placed in the vehicle width direction so as to connect respective inner sides, in the vehicle width direction, of the side sills to each other. The side sill is constituted by a side sill inner and a side sill outer reinforcement and forms a closed section extending in the vehicle front-rear direction. A bulk head is placed inside a closed-section space of the side sill at a position where the floor cross member is attached. The bulk head includes a front partition wall, a rear partition wall placed behind the front partition wall in the vehicle front-rear direction at a predetermined interval, and a connecting surface configured to connect respective outer sides, in the vehicle width direction, of the front partition wall and the rear partition wall to each other in the vehicle front-rear direction. The front partition wall and the rear partition wall are each provided with a flange attached to an inner surface of the side sill inner.

SUMMARY

However, in the vehicle lower structure described in the related art, a load is input into the side sill from the outside in the vehicle width direction at the time of a collision to a side face of a vehicle. The input load from the outside hi the vehicle width direction is transmitted from the side sill outer reinforcement to the floor cross member via the connecting surface, the front partition wall, the rear partition wall, and the flanges of the bulk head, and the side sill inner. In this case, the input load from the outside in the vehicle width direction is received by the front partition wall and the rear partition wall. In such a structure, a buckling load of the bulk head is small, so it is difficult to sufficiently transmit the input load from the outside in the vehicle width direction to the floor cross member. When the plate thickness of the bulk head is made large to sufficiently transmit the input load from the outside in, the vehicle width direction to the floor cross member, for example, the weight of the vehicle body increases. This might consequently cause an increase in cost and a decrease in fuel efficiency of the vehicle.

The disclosure provides a vehicle-body lower structure that can sufficiently transmit an input load from the outside in the vehicle width direction to a cross, member without increasing the weight of a vehicle body.

A vehicle-body lower structure according to one aspect of the disclosure includes: a side sill extending in a vehicle-body front-rem direction; and a cross member disposed inward of the side sill in a vehicle width direction and extending in the vehicle width direction, wherein the side sill includes a side sill outer and a side sill inner disposed inward of the side sill outer in the vehicle width direction, a bulk having a shape corresponding to the cross member is provided on the opposite side of the side sill inner from the cross member in a closed-section space formed by the side sill outer and the side sill inner, the bulk includes a front wall portion, a rear wall portion placed behind the front wall portion in the vehicle-body front-rear direction, and a connecting wall portion connecting the front wall portion and the rear wall portion, the front wall portion and the connecting wall portion forming a first edge line extending in the vehicle width direction, and the rear wall portion and the connecting wall portion forming a second edge line extending in the vehicle width direction.

According to the above aspect, an input load from the outside in the vehicle width direction at the time of a collision to a side face of a vehicle is transmitted from the side sill outer to the cross member via the edge lines of the bulk and the side sill inner. Thus, the input load from the outside in the vehicle width direction is received by the edge lines as the connecting portions of the connecting wall portion with the front wall portion and the rear wall portion. On this account, a buckling load of the bulk becomes large. This makes it possible to sufficiently transmit the input load from the outside in the vehicle width direction to the cross member without increasing the weight of the vehicle body.

In the above aspect, the connecting wall portion may be an upper wall portion connecting an upper end of the front wall portion to an upper end of the rear wall portion. According to the above configuration, at the time of a collision to the side face of the vehicle, the side sill is pressed diagonally upward in the vehicle body, so that a load is easily input into an upper part of the bulk. In view of this, since the upper wall portion configured to connect the upper end of the front wall portion to the upper end of the rear wall portion is provided in the bulk, the input load from the outside in the vehicle width direction is transmitted to the cross member via the edge lines as the connecting portions of the upper wall portion with the front wall portion and the rear wall portion. Accordingly, the input load from the outside in the vehicle width direction can be sufficiently transmitted to the cross member.

In the above aspect each of the front wall portion and the rear wall portion may be provided with a bead diagonally extending from a lower end portion on an outer side in the vehicle width direction to an upper end portion on an inner side in the vehicle width direction. According to the above configuration, when the side sill is pressed diagonally upward in the vehicle body, the bulk is also pressed diagonally upward in the vehicle body, so that a load input direction to the bulk becomes close to the extending direction of the beads. Accordingly, breaking of the bulk is restrained by the beads, so that breaking of a section of the side sill is restrained. Hereby, the input load from the outside in the vehicle width direction can be more sufficiently transmitted to the cross member.

In the above aspect the bulk may have a shape in, which the front wall portion and the rear wall portion intersect with the cross member. According to the above configuration, even if the positions of the front wall portion and the rear wall portion deviate in the vehicle-body front-rear direction or the vehicle-body up-down direction from the cross member to some extent, a load is surely transmitted from the bulk to the cross member.

In the above aspect, the cross member may include a front wall portion extending the vehicle width direction, a rear wall portion extending the vehicle width direction behind the front wall portion of the cross member in the vehicle-body front-rear direction, and an upper wall portion connecting upper ends of the front wall portion and the rear wall portion of the cross member, the front wall portion of the bulk may intersect with the front wall portion of the cross member, and the rear wall portion of the bulk may intersect with the rear wall portion of the cross member.

With the disclosure, it is possible to sufficiently transmit the input load from the outside in the vehicle width direction to the cross member without increasing the weight of the vehicle body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment of the disclosure in detail with reference to the drawings.

Figure 1:
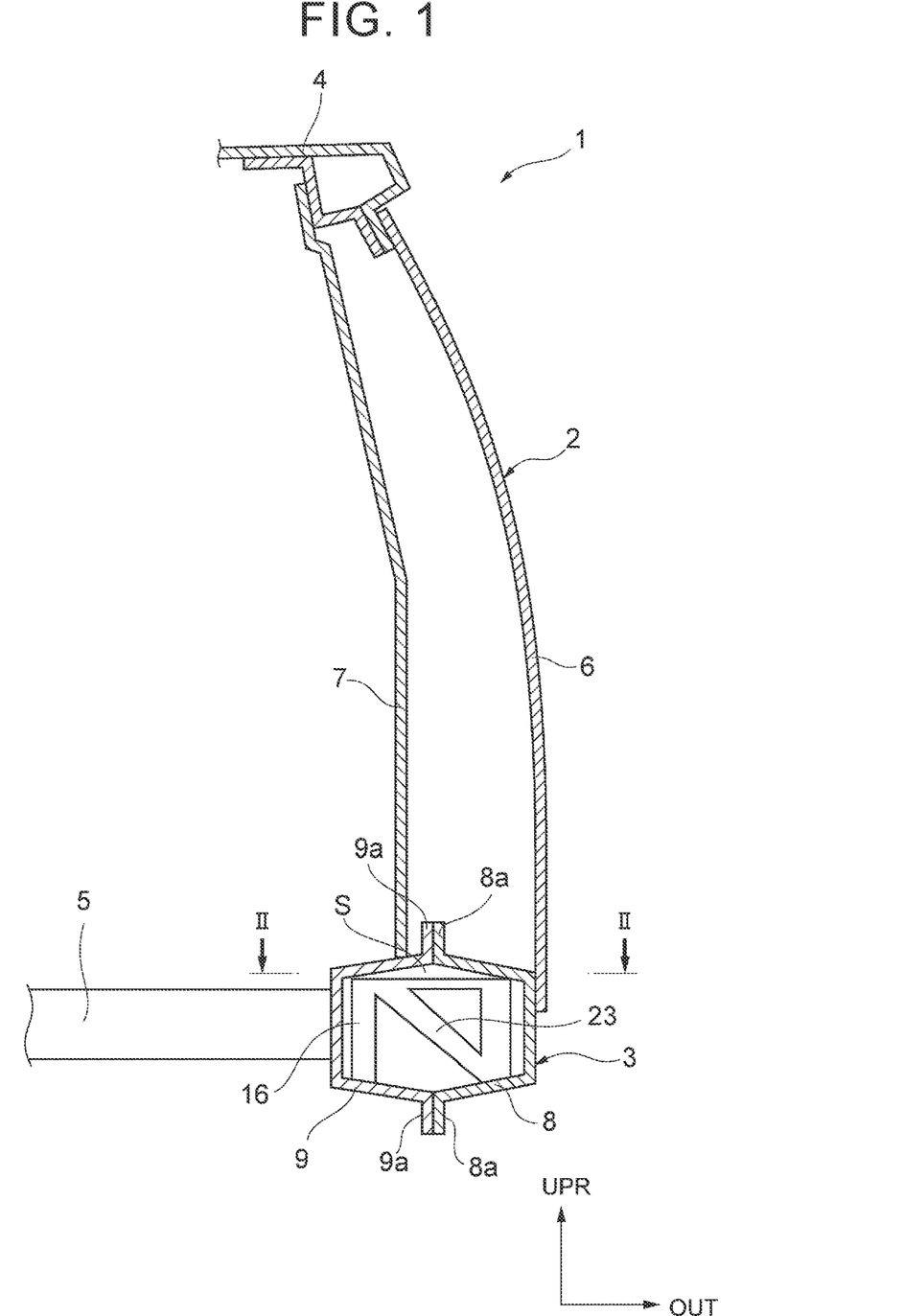
FIG. 1 is a schematic sectional view illustrating a side portion of a vehicle body including a vehicle-body lower structure according to one embodiment of the disclosure.
Figure 2:
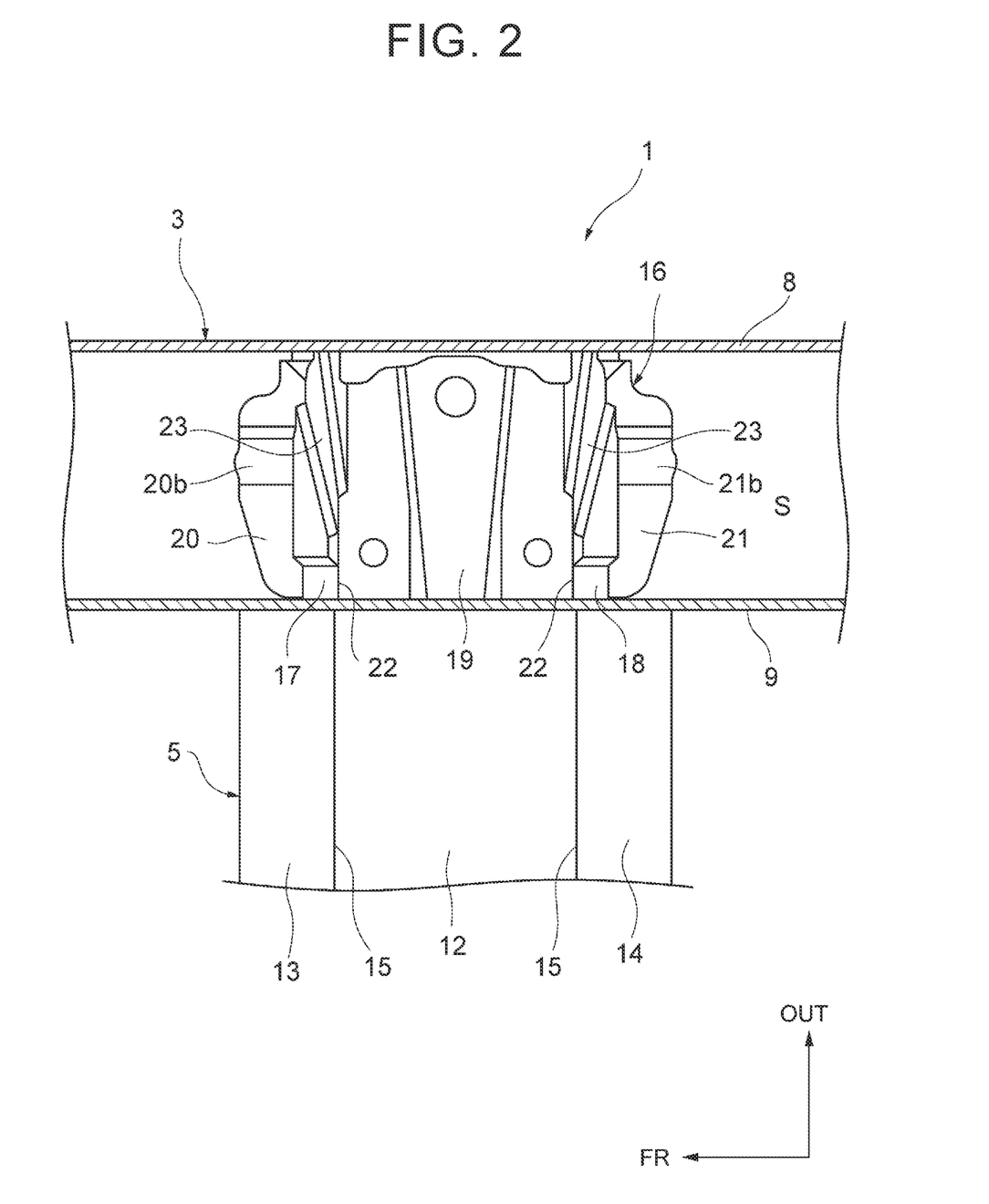
FIG. 2 is a sectional view taken along a line II-II in FIG. 1.

FIG. 1 is a schematic sectional view illustrating a side portion of a vehicle body including a vehicle-body lower structure according to one embodiment of the disclosure. FIG. 2 is a sectional view taken along a line II-II in FIG. 1. In FIGS. 1 and 2, a vehicle body 1 is provided in a vehicle. Note that an arrow FR in the figures indicates the front side in the front-rear direction of the vehicle body 1 (hereinafter referred to as the vehicle-body front-rear direction), an arrow UPR in the figures indicates the upper side in the up-down direction of the vehicle body 1 (hereinafter referred to as the vehicle-body up-down direction), and an arrow OUT in the figures indicates the outer side in the width direction of the vehicle body 1 (hereinafter referred to as the vehicle width direction).

The vehicle body 1 includes a center pillar 2 extending in the vehicle-body up-down direction, a side sill 3 fixed to a lower end portion of the center pillar 2 and extending in the vehicle-body front-rear direction, a roof side rail 4 fixed to an upper end portion of the center pillar 2 and extending in the vehicle-body front-rear direction, and a floor cross member 5 placed inwardly in the vehicle width direction from the side sill 3 and extending in the vehicle width direction.

The center pillar 2 includes a pillar outer panel 6, and a pillar inner panel 7 placed inwardly in the vehicle width direction from the pillar outer panel 6. The pillar outer panel 6 and the pillar inner panel 7 are made of a steel sheet. Note that FIG. 2 does not illustrate the pillar outer panel 6.

The side sill 3 includes a side sill outer 8, and a side sill inner 9 placed inwardly in the vehicle width direction from the side sill outer 8. The side sill outer 8 and the side sill inner 9 are made of a steel sheet.

The side sill outer 8 and the side sill inner 9 have a generally U-shaped section. An upper end portion and a lower end portion of the side sill outer 8 are provided with respective overhanging portions 8a. An upper end portion and a lower end portion of the side sill inner 9 are provided with respective overhanging portions 9a. The overhanging portions 8a, 9a are joined to each other by welding. Hereby, the side sill outer 8 and the side sill inner 9 form a closed-section space S in collaboration with each other.

Figure 3:
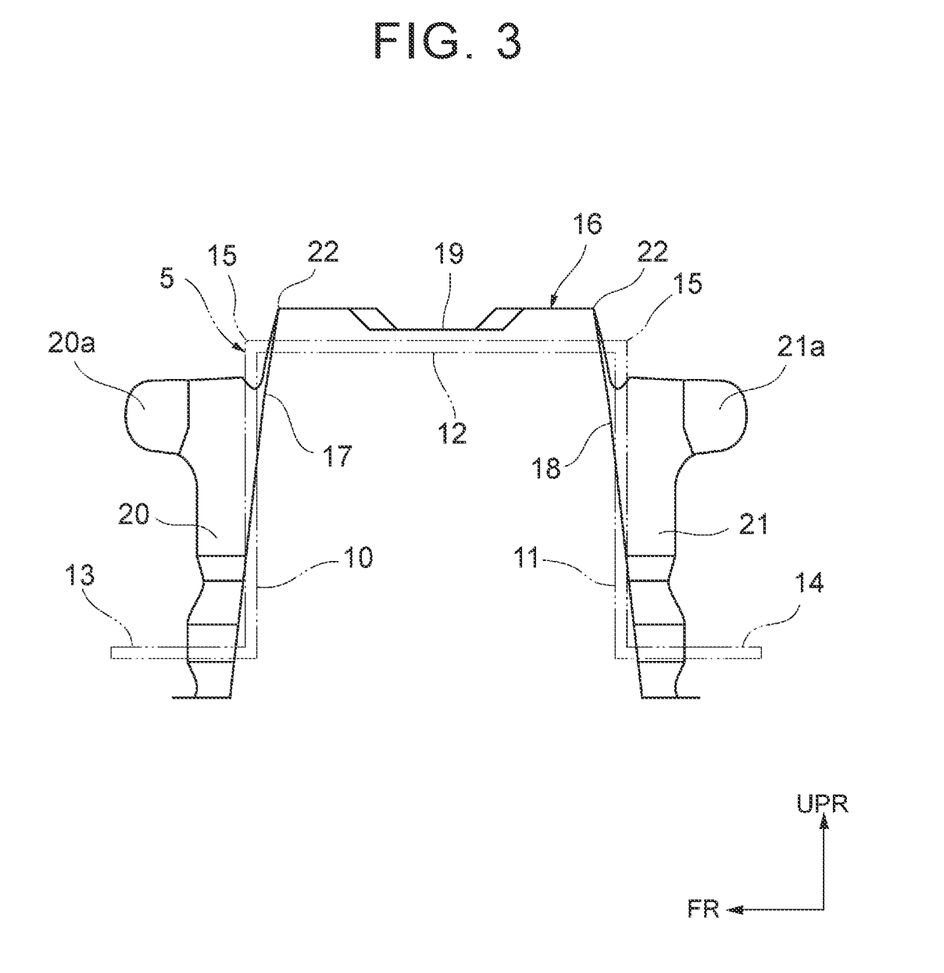
FIG. 3 is a side view of a bulk illustrated in FIGS. 1 and 2.

The floor cross member 5 is placed, for example, at a position corresponding to the center pillar 2. The floor cross member 5 reinforces a floor panel (not shown). The floor cross member 5 is made of a steel sheet. The floor cross member 5 hast generally U-shaped section as illustrated in FIG. 3.

The floor cross member 5 includes a front wall portion 10, a rear wall portion 11, an upper wall portion 12, and overhanging portions 13, 14. The rear wall portion 11 is placed behind the front wall portion 10. The upper wall portion 12 is provided to connect an upper end of the front wall portion 10 to an upper end of the rear wall portion 11. The overhanging portion 13 is connected to a lower end of the front wall portion 10. The overhanging portion 14 is connected to a lower end of the rear wall portion 11. The overhanging portions 13, 14 are fixed to the floor panel (not shown).

Respective connecting portions of the upper wall portion 12 with the front wall portion 10 and the rear wall portion 11 are formed into edge lines 15 extending in the vehicle width direction. That is, the upper wall portion 12 forms two edge lines 15 in collaboration with the front wall portion 10 and the rear wall portion 11.

A bulk 16 is placed inside the closed-section space S of the side sill 3 so as to face the floor cross member 5 across the side sill inner 9. The bulk 16 has a generally U-shaped section as illustrated in FIG. 3. That is, the bulk 16 has a shape corresponding to the floor cross member 5. The bulk 16 is made of a thin steel sheet.

Figure 4:
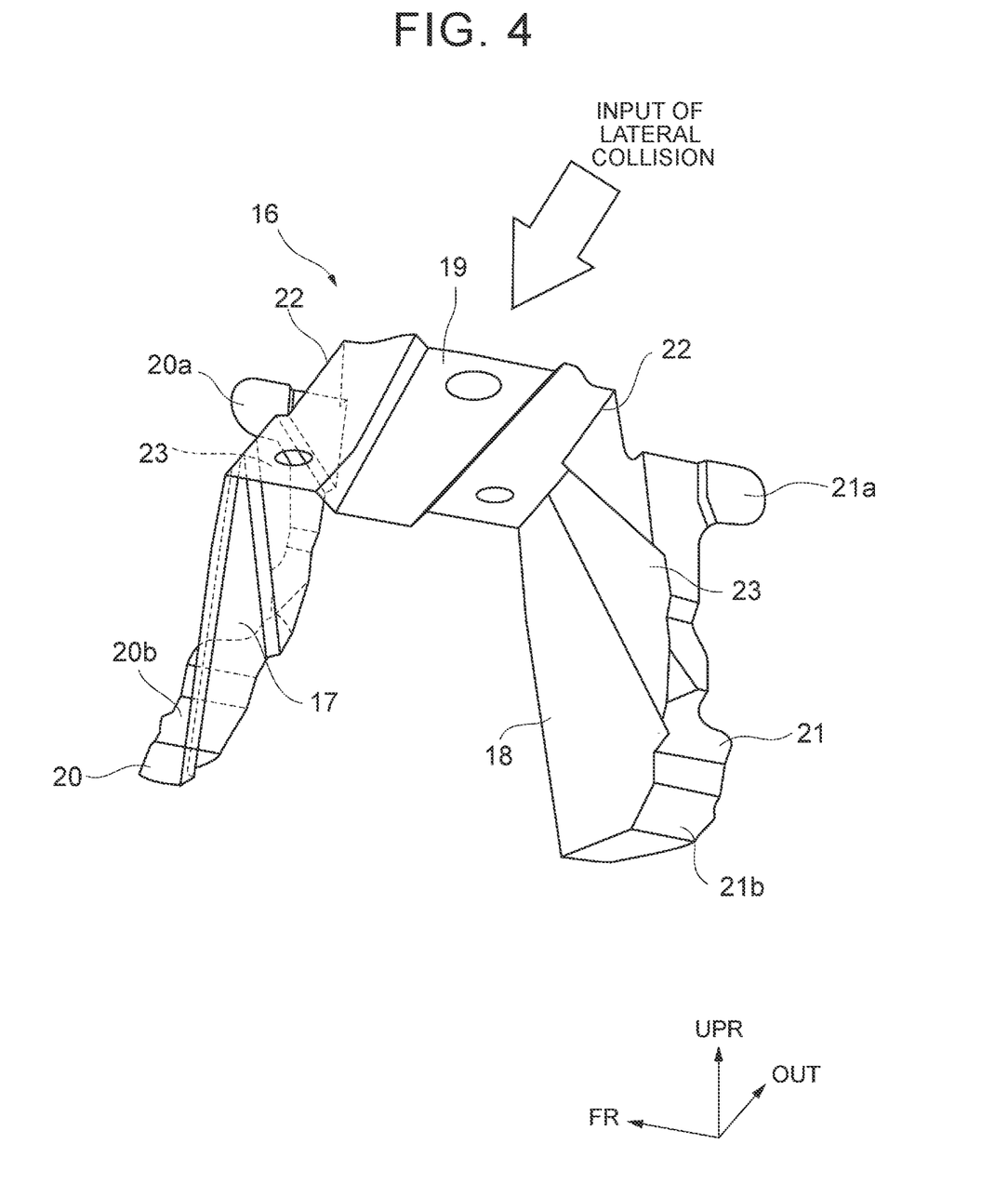
FIG. 4 is a perspective view of the bulk illustrated in FIGS. 1 and 2.

As illustrated in FIGS. 3 and 4, the bulk 16 includes a front wall portion 17, a rear wall portion 18, an upper wall portion 19, and overhanging portions 20, 21. The rear wall portion 18 is placed behind the front wall portion 17. The upper wall portion 19 is a connecting wall portion provided to connect an upper end of the front wall portion 17 to an upper end of the rear wall portion 18. The overhanging portion 20 is connected to a lower end and an outer end of the front wall portion 17. The overhanging portion 21 is connected to a lower end and an outer end of the rear wall portion 18. The overhanging portion 20 is provided with fixed parts 20a, 20b. The overhanging portion 21 is provided with fixed parts 21a, 21b. The fixed parts 20a, 20b, 21a, 21b are joined to the side sill outer 8 by welding.

Respective connecting portions of the upper wall portion 19 with the front wall portion 17 and the rear wall portion 18 are thrilled into edge lines 22 extending in the vehicle width direction. That is, the upper wall portion 19 forms two edge lines 22 in collaboration with the front wall portion 17 and the rear wall portion 18.

An outer wall surface of each of the front wall portion 17 and the rear wall portion 18 is provided with a projecting bead 23 diagonally extending from a lower end portion on the outer side in the vehicle width direction to an upper end portion on the inner side in the vehicle width direction. The bead 23 has a function to reinforce the front wall portion 17 and the rear wall portion 18.

As illustrated in FIG. 3, the bulk 16 has a shape in which the front wall portion 17 intersects with the front wall portion 10 of the floor cross member 5 and the rear wall portion 18 intersects with the rear wall portion 11 of the floor cross member 5.

Figure 5A:
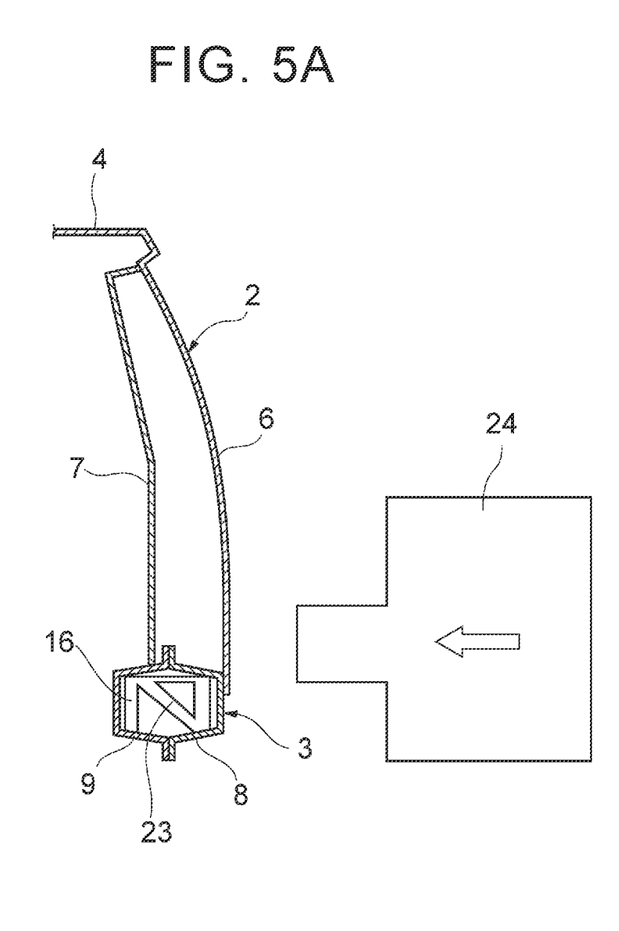
FIG. 5A is a schematic sectional view illustrating a state before a side sill deforms at the time of a collision to a side face of a vehicle.
Figure 5B:
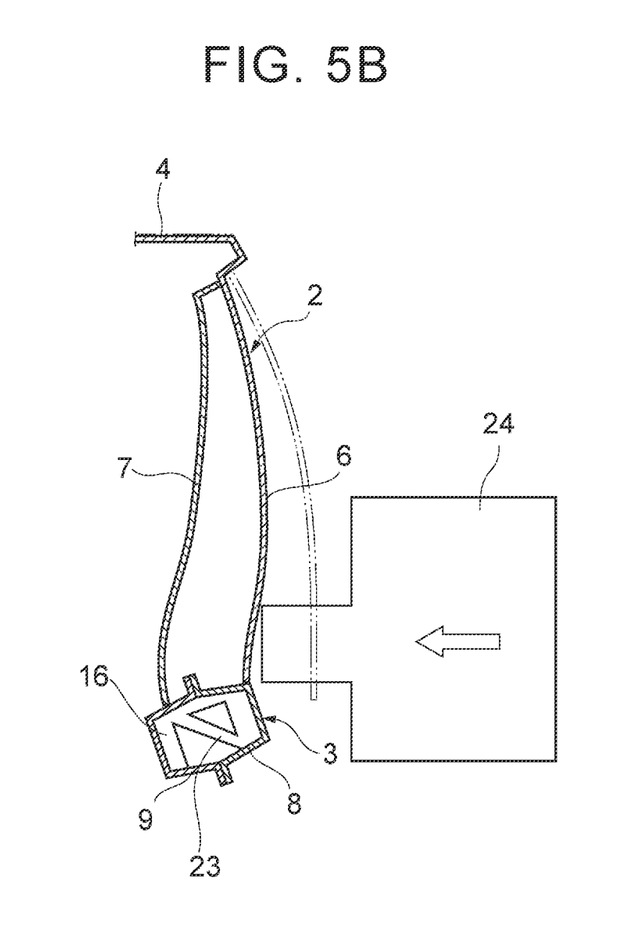
FIG. 5B is a schematic sectional view illustrating a state where the side sill deforms at the time of a collision to the side face of the vehicle.

In the above configuration, as illustrated in FIGS. 5A, 5B, when the vehicle has a collision (a lateral collision) to its side face, the center pillar 2 deforms by being pressed inwardly in the vehicle width direction. Hereby, the side sill 3 is pressed inwardly in the vehicle width direction so that the side sill 3 is drawn diagonally upward in the vehicle body 1, and thus, a load is input into the side sill 3 from the outside in the vehicle width direction. Note that FIGS. 5A, 5B illustrate a state where a lateral collision barrier 24 laterally collides with the vehicle. The lateral collision, barrier 24 is a bogie for a lateral collision test. At this time, the input load from the outside in the vehicle width direction is transmitted from the side sill outer 8 to the floor cross member 5 via the edge lines 22 of the bulk 16 and the side sill inner 9.

Figure 6:
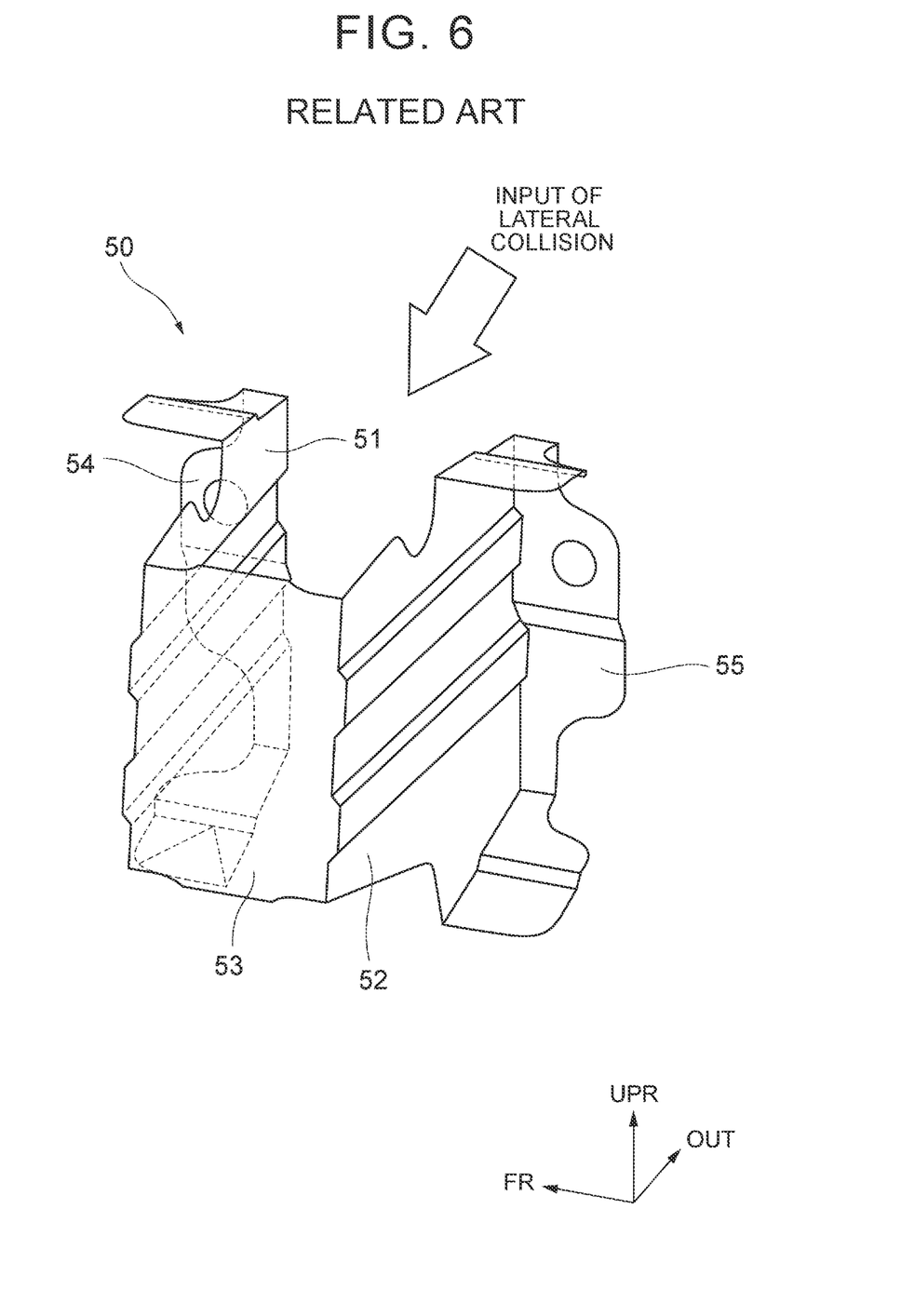
FIG. 6 is a perspective view illustrating one comparative example of the bulk.

FIG. 6 is a perspective view illustrating one comparative example of the bulk. In FIG. 6, a bulk 50 of this comparative example includes a front wall portion 51, a rear wall portion 52, a side wall portion 53, and overhanging portions 54, 55. The side wall portion 53 is provided to connect an inner end of the front wall portion 51 to an inner end of the rear wall portion 52. The overhanging portion 54 is connected to a lower end and an outer end of the front wall portion 51. The overhanging portion 55 is connected to a lower end and an outer end of the rear wall portion 52.

In such a comparative example, an input load from the outside in the vehicle width direction at the time of a collision to the side face of the vehicle is transmitted from the side sill outer 8 to the floor cross member 5 via the front wall portion 51, the rear will portion 52, and the side wall portion 53 of the bulk 50, and the side sill inner 9. Accordingly, in the comparative example, the input load from the outside in the vehicle width direction is received by surfaces of the front wall portion 51 and the rear wall portion 52.

Here, the floor cross member 5 has two edge lines 15. On this account, the bulk 50 needs to transmit the input load from the outside in the vehicle width direction to the edge lines 15 of the floor cross member 5. However, in the structure in which the input load from the outside in the vehicle width direction is received by the surfaces of the front wall portion 51 and the rear wall portion 52, a buckling load of the bulk 50 is small, so it is difficult to sufficiently transmit the input load from the outside in the vehicle width direction to the floor cross member 5. In order to sufficiently transmit the input load from the outside in the vehicle width direction to the floor cross member 5, it is necessary to increase the plate thickness of the bulk 50 or it is necessary to use two bulks 50 placed at positions respectively corresponding to the edge lines 15 of the floor cross member 5 to transmit the input load to each of the edge lines 15 of the floor cross member 5. When the plate thickness of the bulk 50 is increased, the mass of the bulk 50 increases, and this leads to an increase in cost and an increase in weight of the vehicle body. When two bulks 50 are used, the number of components and the man-hour for welding increase, and this leads to an increase in cost and an increase in weight of the vehicle body.

However, in the present embodiment, the input load from the outside in the vehicle width direction at the time of a collision to the side face of the vehicle is transmitted from the side sill outer 8 to the floor cross member 5 via the edge lines 22 of the bulk 16 and the side sill inner 9. Thus, the input load from the outside in the vehicle width direction is received by the edge lines 22 as the connecting portions of the upper wall portion 19 with the front wall portion 17 and the rear wall portion 18. On this account, a buckling load of the bulk 16 becomes lame. Hereby, the input load from the outside in the vehicle width direction can be sufficiently transmitted to the floor cross member 5. As a result, it is not necessary to increase the plate thickness of the bulk 16, so that the mass of the bulk 16 can be reduced and the weight of the vehicle body 1 can be reduced. Further, just one bulk 16 is used, so that the weight of the vehicle body 1 can be reduced, and the number of components and the man-hour for welding can be reduced. This makes it possible to achieve cost reduction. Further, since the weight of the vehicle body 1 is reduced, the fuel efficiency of the vehicle can be improved.

Further, at the time of a collision to the side face of the vehicle, as illustrated in FIG. 5B, the side sill 3 is pressed diagonally upward in the vehicle body 1, so that a load is easily input into an upper part of the bulk 16. In the present embodiment, since the upper wall portion 19 configured to connect the upper end of the front wall portion 17 to the upper end of the rear wall portion 18 is provided in the bulk 16, the input load from the outside in the vehicle width direction is transmitted to the floor cross member 5 via the edge lines 22 as the connecting portions of the upper wall portion 19 with the front wall portion 17 and the rear wall portion 18, as described above. Accordingly, the input load from the outside in the vehicle width direction can be sufficiently transmitted to the floor cross member 5.

Further, in the present embodiment, each of the front wall portion 17 and the rear wall portion 18 of the bulk 16 is provided with the bead 23 diagonally extending from the lower end portion on the outer side in the vehicle width direction to the upper end portion on the inner side in the vehicle width direction. As illustrated in FIG. 5B, when the side sill 3 is pressed diagonally upward in the vehicle body 1, the bulk 16 is also pressed diagonally upward in the vehicle body 1, so that a load input direction to the bulk 16 becomes close to the extending direction of the bead 23. Accordingly, breaking of the bulk 16 is restrained by the beads 23, so that breaking of a section of the side sill 3 is restrained. Hereby, the input load from the outside in the vehicle width direction can be more sufficiently transmitted to the floor cross member 5.

Further, in the present embodiment, the bulk 16 has a shape in which the front wall portion 17 and the rear wall portion 18 intersect with the floor cross member 5. Accordingly, even if the positions of the front wall portion 17 and the rear wall portion 18 deviate in the vehicle-body front-rear direction or the vehicle-body up-down direction from the front wall port on 10 and the rear wall portion 11 of the floor cross member 5 to some extent, respectively, a load is transmitted from the bulk 16 to the floor cross member 5.

Note that the disclosure is not limited to the above embodiment. For example, in the above embodiment, the bulk 16 includes the upper wall portion 19 provided to connect the upper end of the front wall portion 17 to the upper end of the rear wall portion 18, but the structure of the bulk 16 is not particularly limited to such a configuration. For example, in a case where the floor cross member 5 has a generally H-shape, the bulk 16 is also configured to have a generally H-shape corresponding to the floor cross member 5. In this case, the bulk 16 includes a connecting wall portion configured to connect a part between the upper end and the lower end in the front wall portion 17 to a part between the upper end and the lower end in the rear wall portion 18.

Further, in the above embodiment, the bulk 16 has a shape in which the front wall portion 17 intersects with the front wall portion 10 of the floor cross member 5 and the rear wall portion 18 intersects with the rear wall portion 11 of the floor cross, member 5, but the shape of the bulk 16 is not particularly limited to such, a shape. The shapes of the front wall portion 17 and the rear wall portion 18 of the bulk 16 may be formed in shapes completely corresponding to the front wall portion 10 and the rear wall portion 11 of the floor cross member 5, respectively, so that the front wall portion 17 and the rear wall portion 18 may be configured not to intersect with the front wall portion 10 and the rear wall portion 11, respectively.

Further, in the above embodiment, the bulk 16 transmits the input load from the outside in the vehicle width direction to the floor cross member 5, but the disclosure is not particularly limited, to the floor cross member 5 and is also applicable to a front cross member and a rear cross member. More specifically, the bulk 16 may transmit the input load from the outside in the vehicle width direction to the front cross member or may transmit the input load to the rear cross member.

What is claimed is:

1. A vehicle-body lower structure, comprising:
    a side sill extending in a vehicle-body front-rear direction; and
    a cross member disposed inward of the side sill in a vehicle width direction and extending in the vehicle width direction, the cross member having a generally U-shape, wherein
    the side sill includes a side sill outer and a side sill inner disposed inward of the side sill outer in the vehicle width direction,
    a bulk having a generally U-shape corresponding to the generally U-shape of the cross member is provided on the opposite side of the side sill inner from the cross member in a closed-section space formed by the side sill outer and the side sill inner, the bulk includes open ends in the vehicle width direction, and
    the bulk includes a front wall portion, a rear wall portion placed behind the front wall portion in the vehicle-body front-rear direction, and a connecting wall portion connecting the front wall portion and the rear wall portion, the front wall portion and the connecting wall portion forming a first edge line extending in the vehicle width direction, and the rear wall portion and the connecting wall portion forming a second edge line extending in the vehicle width direction.

2. The vehicle-body lower structure according to claim 1, wherein the connecting wall portion is an upper wall portion connecting an upper end of the front wall portion to an upper end of the rear wall portion.

3. The vehicle-body lower structure according to claim 2, wherein each of the front wall portion and the rear wall portion is provided with a bead diagonally extending from a lower end portion on an outer side in the vehicle width direction to an upper end portion on an inner side in the vehicle width direction.

4. The vehicle-body lower structure according to claim 1, wherein the generally U-shape of the bulk and the generally U-shape of the cross member correspond such that the front wall portion and the rear wall portion intersect with the cross member.

5. The vehicle-body lower structure according to claim 4, wherein
    the cross member includes a front wall portion extending the vehicle width direction, a rear wall portion extending the vehicle width direction behind the front wall portion of the cross member in the vehicle-body front-rear direction, and an upper wall portion connecting upper ends of the front wall portion and the rear wall portion of the cross member,
    the front wall portion of the bulk intersects with the front wall portion of the cross member, and
    the rear wall portion of the bulk intersects with the rear wall portion of the cross member.

6. A vehicle-body lower structure, comprising:
    a side sill extending in a vehicle-body front-rear direction; and
    a cross member disposed inward of the side sill in a vehicle width direction and extending in the vehicle width direction, wherein
    the side sill includes a side sill outer and a side sill inner disposed inward of the side sill outer in the vehicle width direction,
    a bulk having a shape corresponding to the cross member is provided on the opposite side of the side sill inner from the cross member in a closed-section space formed by the side sill outer and the side sill inner,
    the bulk includes a front wall portion, a rear wall portion placed behind the front wall portion in the vehicle-body front-rear direction, and a connecting wall portion connecting the front wall portion and the rear wall portion, the front wall portion and the connecting wall portion forming a first edge line extending in the vehicle width direction, and the rear wall portion and the connecting wall portion forming a second edge line extending in the vehicle width direction, and
    upon a collision to a side face of the vehicle-body lower structure, the first line edge and the second line edge are configured to transmit a load from an outside in the vehicle width direction to the cross member.

7. The vehicle-body lower structure according to claim 6, wherein the connecting wall portion is an upper wall portion connecting an upper end of the front wall portion to an upper end of the rear wall portion.

8. The vehicle-body lower structure according to claim 7, wherein each of the front wall portion and the rear wall portion is provided with a bead diagonally extending from a lower end portion on an outer side in the vehicle width direction to an upper end portion on an inner side in the vehicle width direction.

9. The vehicle-body lower structure according to claim 6, wherein the bulk has a shape in which the front wall portion and the rear wall portion intersect with the cross member.

10. The vehicle-body lower structure according to claim 9, wherein
    the cross member includes a front wall portion extending the vehicle width direction, a rear wall portion extending the vehicle width direction behind the front wall portion of the cross member in the vehicle-body front-rear direction, and an upper wall portion connecting upper ends of the front wall portion and the rear wall portion of the cross member, the front wall portion of the bulk intersects with the front wall portion of the cross member, and the rear wall portion of the bulk intersects with the rear wall portion of the cross member.

11. A vehicle-body lower structure, comprising:

a side sill extending in a vehicle-body front-rear direction; and a cross member disposed inward of the side sill in a vehicle width direction and extending in the vehicle width direction, wherein the side sill includes a side sill outer and a side sill inner disposed inward of the side sill outer in the vehicle width direction, a bulk having a shape corresponding to the cross member is provided on the opposite side of the side sill inner from the cross member in a closed-section space formed by the side sill outer and the side sill inner, the bulk includes a front wall portion, a rear wall portion placed behind the front wall portion in the vehicle-body front-rear direction, and a connecting wall portion connecting the front wall portion and the rear wall portion, the front wall portion and the connecting wall portion forming a first edge line extending in the vehicle width direction, and the rear wall portion and the connecting wall portion forming a second edge line extending in the vehicle width direction, and the front wall portion and the rear wall portion of the bulk are joined to the side sill outer.

12. The vehicle-body lower structure according to claim 11, wherein the connecting wall portion is an upper wall portion connecting an upper end of the front wall portion to an upper end of the rear wall portion.

13. The vehicle-body lower structure according to claim 12, wherein each of the front wall portion and the rear wall portion is provided with a bead diagonally extending from a lower end portion on an outer side in the vehicle width direction to an upper end portion on an inner side in the vehicle width direction.

14. The vehicle-body lower structure according to claim 11, wherein the bulk has a shape in which the front wall portion and the rear wall portion intersect with the cross member.

15. The vehicle-body lower structure according to claim 14, wherein the cross member includes a front wall portion extending the vehicle width direction, a rear wall portion extending the vehicle width direction behind the front wall portion of the cross member in the vehicle-body front-rear direction, and an upper wall portion connecting upper ends of the front wall portion and the rear wall portion of the cross member, the front wall portion of the bulk intersects with the front wall portion of the cross member, and the rear wall portion of the bulk intersects with the rear wall portion of the cross member.

16. The vehicle-body lower structure according to claim 11, wherein the front wall portion includes at least one front fixing part that extends outwardly from a rear end of the front wall in the vehicle-body front-rear direction, the at least one front fixing part is joined to the side sill outer.

17. The vehicle-body lower structure according to claim 11, wherein the rear wall portion includes at least one rear fixing part that extends outwardly from a rear end of the rear wall portion in the vehicle-body front-rear direction, the at least one rear fixing part is joined to the side sill outer.

18. The vehicle-body lower structure according to claim 16, wherein the rear wall portion includes at least one rear fixing part that extends outwardly from a rear end of the rear wall portion in the vehicle-body front-rear direction, the at least one rear fixing part is joined to the side sill outer.

19. The vehicle-body lower structure according to claim 11, wherein the front wall portion and the rear wall portion of the bulk are joined to the side sill outer by welding.

20. The vehicle-body lower structure according to claim 18, wherein the at least one front fixing part and the at least one rear fixing part are joined to the side sill outer by welding.

* * * * *

UNITED STATES PATENT AND TRADEMARK OFFICE
CERTIFICATE OF CORRECTION

PATENT NO.         : 10,882,560 B2
APPLICATION NO.    : 16/293780
DATED              : January 5, 2021
INVENTOR(S)        : Yukihiro Onishi, Nobuhiro Ichimura and Mikio Nakashima It is certified that error appears in the above-identified patent and that said Letters Patent is hereby corrected as shown below:

On the Title Page

Item (57), Line(s) 13, after "wall", delete ",".

In the Specification

In Column 1, Line(s) 23, after "for example", delete "," and insert --.--, therefor.

In Column 1, Line(s) 48, after "outside", delete "hi" and insert --in--, therefor.

In Column 1, Line(s) 60, after "in", delete ",".

In Column 1, Line(s) 66, after "cross", delete ",".

In Column 2, Line(s) 3, delete "front-rem" and insert --front-rear--, therefor.

In Column 2, Line(s) 63, after "shape in", delete ",".

In Column 4, Line(s) 26, delete "hast" and insert --has a--, therefor.

In Column 4, Line(s) 67, delete "thrilled" and insert --formed--, therefor.

In Column 5, Line(s) 25, after "collision", delete ",".

In Column 5, Line(s) 45, delete "will" and insert --wall--, therefor.

In Column 6, Line(s) 15, delete "lame" and insert --large--, therefor.

In Column 6, Line(s) 62, delete "port on" and insert --portion--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

In Column 7, Line(s) 16, after "cross", delete ",".

In Column 7, Line(s) 17, after "such", delete ",".